US006948257B1

(12) United States Patent
Barr, Jr.

(10) Patent No.: US 6,948,257 B1
(45) Date of Patent: Sep. 27, 2005

(54) MARKING DEVICE WITH SELF-HINGED CONTACT PLATE AND MARKING MEMBERS

(76) Inventor: William A. Barr, Jr., 5854 Buffalo River Rd., Earlysville, VA (US) 22936

( * ) Notice: Subject to any disclaimer, the term of this patent is extended or adjusted under 35 U.S.C. 154(b) by 0 days.

(21) Appl. No.: 10/282,662

(22) Filed: Oct. 29, 2002

Related U.S. Application Data

(63) Continuation-in-part of application No. 09/851,007, filed on May 8, 2001, now Pat. No. 6,470,585, which is a continuation-in-part of application No. 09/258,874, filed on Feb. 26, 1999, now Pat. No. 6,226,822.

(60) Provisional application No. 60/082,834, filed on Apr. 23, 1998, and provisional application No. 60/076,349, filed on Feb. 27, 1998.

(51) Int. Cl.[7] .......................... G01B 1/00; B41F 31/00; B41K 1/42

(52) U.S. Cl. ............................ 33/528; 33/668; 33/768; 101/327; 101/333

(58) Field of Search ................................ 101/327, 105, 101/333; 33/528, 333, 668, 768, 42, 666, 562, 563, DIG. 10

(56) References Cited

U.S. PATENT DOCUMENTS

| | | | | |
|---|---|---|---|---|
| 4,335,511 A | | 6/1982 | Bowling | |
| 4,735,143 A | * | 4/1988 | Weir | 101/333 |
| 4,852,007 A | * | 7/1989 | Yasunobu et al. | 701/70 |
| 4,953,733 A | | 9/1990 | Loscuito | |
| 4,969,269 A | | 11/1990 | Dominguez | |
| 4,970,954 A | * | 11/1990 | Weir et al. | 101/334 |
| 5,107,601 A | | 4/1992 | Semchuck | |
| 5,765,484 A | * | 6/1998 | Lam | 101/327 |
| 5,850,787 A | * | 12/1998 | Pichler | 101/105 |
| 5,899,142 A | * | 5/1999 | Suda et al. | 101/125 |
| 6,226,822 B1 | | 5/2001 | Chen | |
| 6,470,585 B2 | | 10/2002 | Barr | |

* cited by examiner

*Primary Examiner*—Gail Verbitsky
(74) *Attorney, Agent, or Firm*—Jagtiani + Guttag

(57) ABSTRACT

A marking device is disclosed to enable the placement of an indicator mark on one side of a sheet of material to mark the approximate periphery of a stationary object. The device consists of a base containing multiple marking members with a marking surface raised above the base surface. A contact plate, portions of which extend above the base surface, is connected to the base through the use of a pair of opposing connectors. The contact plate extends from the base a distance sufficient to prevent the sheet material from contacting the marking members without the application of sufficient pressure to compress the contact plate.

10 Claims, 2 Drawing Sheets

MARKING DEVICE WITH SELF-HINGED CONTACT PLATE AND MARKING MEMBERS

RELATE BACK TO PARENT APPLICATION

This application is a continuation in part of U.S. application Ser. No. 09/851,007 filed May 8, 2001 and issued Oct. 29, 2002 as U.S. Pat. No. 6,470,585, which is a continuation in part of 09/258,874 filed Feb. 26, 1999 and issued as U.S. Pat. No. 6,226,822 issued May 8, 2001, which is a continuation in part of Provisionals Nos. 60/082,834 filed Apr. 23, 1998 and 60/076,349 filed Feb. 27, 1998, all of which are incorporated herein as if recited in full.

BACKGROUND OF THE INVENTION

1. Field of the Invention

The invention relates to marking the backside of sheet material to enable openings to be accurately located and cut into the material.

2. Brief Description of the Prior Art

Plasterboard, also known as Sheetrock®, wallboard and gypsum board, has been used to replace plaster in construction for several decades. In comparison to plaster, plasterboard installs rapidly and requires substantially less manual labor. Plasterboard, however, still has installation problems which the industry has been attempting to solve.

Not the least of these problems is the marking of specific areas to be cut out. Currently these areas, such as for outlet boxes, heating vents, etc., are measured vertically and horizontally, from the adjacent plasterboard and floor or ceiling. The measurements are subsequently transferred to the plasterboard for cutting and installation. This is a time consuming process, even for professional installers. Plasterboard fortunately provides some leeway in that "mistakes" can be compensated through the use of spackle. The installation of wall paneling, however, does not provide any such leeway and a mistake in cutting can be quite costly.

The need for a rapid, easy to use marking device has been recognized in the construction field and is reflected in the prior art patents. U.S. Pat. No. 4,953,733 recognizes the need to mark plasterboard on the back side and has disclosed a device for use with electrical outlet boxes. The '733 device is provided with ears at each corner which fit within the outlet box. Arrow shaped marking elements are provided at the corners to engage the plasterboard. A securing screw can be inserted into a receiving hole within the body of the '733 device to secure the device to the outlet plug. Due to the construction of the '733 device, the marking elements are wedged into the plasterboard to mark the location of the plug outlet. Once the plasterboard is pressed onto the '733 device and removed for cutting the marking device is wedged into the plasterboard and must be removed prior to cutting the marked area. To prevent the device from being removed from the outlet with the plasterboard, the device must be secured through use of the securing screw. One of the problems with the '733 device is the necessity of securing the device to the outlet prior to measuring as well as removing the device after measuring, requiring substantial time on the part of the installer. Further, this device cannot be used on hard materials, such as paneling, tile or plywood. If the device is unsecured and retained within the plasterboard upon removal, the plasterboard must be maintained parallel to the wall during removal. Angling the plasterboard during removal could cause the ears of the device to catch on the outlet or even break up plasterboard.

U.S. Pat. No. 5,107,601, issued to Semchuck, uses a template consisting of indicia which define a hole pattern. These indicia are used to assist in drilling holes for mounting objects, such as towel bars. This device, however applies only to front mounted articles and does not provide any assistance with marking cut outs from the back of a rigid panel.

U.S. Pat. No. 4,969,269 discloses a device for punching cutouts through sheets of drywall. The '269 device has a pulley system which is used to cut the drywall in the shape of the outlet. The device is relatively expensive to produce and complicated to use.

U.S. Pat. No. 4,335,511 covers a marking device that marks the center of the outlet through use of a indicator which places an indentation in the wallboard at the center point of the outlet box. The wallboard is then horizontally placed, one half the depth of the wallboard is cut out in the shape of the outlet on the first side, the wallboard is turned over, and the remaining depth of the cutout is made. Cuts are made by striking the device that cuts into the wallboard. An inherent problem is that wallboard can break easily and unevenly when sharply struck, as it is brittle. Additionally, wallboard, is heavy and not easily moved or turned, rendering the '511 device awkward to use.

The disclosed invention overcomes the difficulties encountered in the prior art by providing a simple, inexpensive device for marking the reverse side of sheets of all types of material, such as paneling, plasterboard, floorboards, tiles, etc.

SUMMARY OF THE INVENTION

An easy to use and accurate marking device is disclosed to enable the placement of an indicator mark on one side of a sheet of material to mark the approximate periphery of a stationary object. The marking device consists of a base, preferably molded from plastic, or other material with a memory, in a single piece mold, containing multiple marking members extending from a first surface of the base. The base has a contact plate receiving area to receive a flexible contact plate, through the use of a pair of opposing connects. A portion of the first surface of the contact plate extends beyond the surface of the base a distance sufficient to prevent the sheet material from contacting the multiple marking members without the application of pressure to flex said contact plate. The marking members can be pins, or other means for marking the sheet material such as a liquid or powered substance. The compression required to place the sheet material in contact with the multiple marking members is dependent the resistance of said contact plate.

BRIEF DESCRIPTION OF THE DRAWINGS

The advantages of the instant disclosure will become more apparent when read with the specification and the drawings, wherein.

DETAILED DESCRIPTION OF THE INVENTION

The disclosed marking device enables a user to rapidly and accurately mark sheets of material with the outline and location of an object positioned behind the material, once mounted. Although cutting plasterboard and paneling at the location of outlet boxes is an obvious use of the marking device, other uses, such as marking air ducts, water pipes, etc. will become evident to those skilled in the art. The marking can, if applicable, be placed on the front of a panel, or other material, to indicate the presence of an underlying object, such as a gas line. The following descriptions relate to the mounting of a rigid material, such as plasterboard or paneling. Other materials, however, can be marked in the same manner as described herein and additional uses for the device will be evident.

The standard practice for marking and cutting outlets and other items located within walls or floors was through measuring. For instance, to cut a sheet of plasterboard for an outlet, the user would measure from the floor to the outlet box and then from the nearest installed sheet or wall to the object. These measurements would then be transferred to the piece of plasterboard. In the transfer, the user must also remember to allow for any off sets required between the floor and the plasterboard. The disclosed device enables the user to place the device onto the outlet, press the plasterboard against the sheet and then cut around the outline. Several embodiments are disclosed that automatically accounts for the floor/plasterboard offset.

In parent patent U.S. Pat. No. 6,226,822 issued May 8, 2001, which is incorporated herein as though recited in full, an outlet device, and various embodiments, was disclosed. In co-pending application U.S. application Ser. No. 09/851,007 filed May 8, 2001 integral contact flanges replaced the full contact pad. It has now been found that a single integral pad can be used, in combination with marking pins, thereby dramatically reducing the cost.

Figure 1:
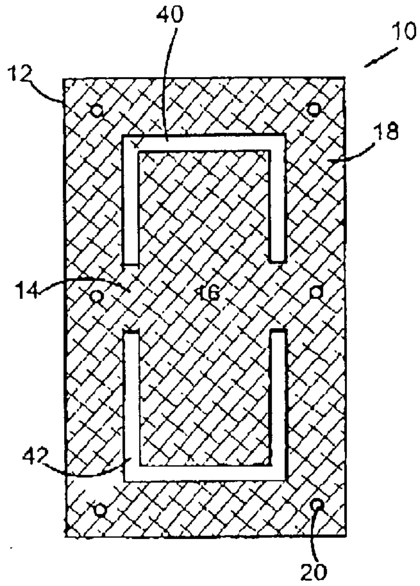
FIG. 1 is a front view of the disclosed marking device.
Figure 2:
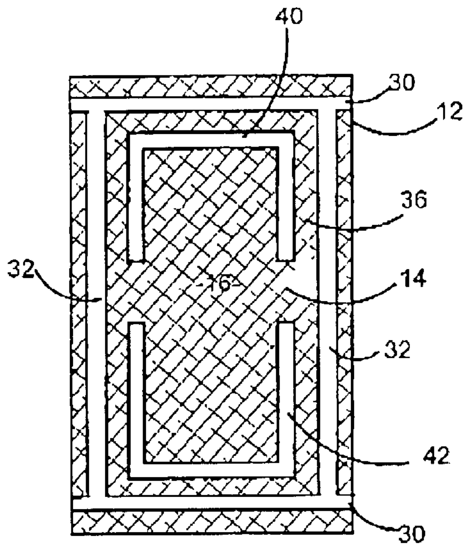
FIG. 2 is a back view of the marking device of FIG. 1.
Figure 3:
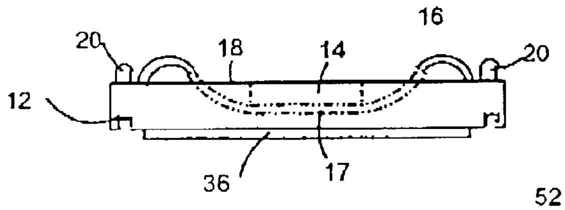
FIG. 3 is a side view of the marking device of FIG. 1.

The embodiment of the marking device 10 illustrated in FIGS. 1, 2 and 3, is configured for use with outlet and switch boxes without the electrical components mounted. Alternate uses, as well as use of the device with mounted electrical components, are addressed in specific embodiments as disclosed in the foregoing co-pending applications. The method of incorporating the improvements disclosed herein with the embodiments of the co-pending application will be obvious to those skilled in the art.

The face 18 of the marking device 10 is illustrated in FIG. 1 wherein the body 12 is provided with an upper cutout 40 and lower cutout 42 that enable the contact plate 16 connectors 14. In this embodiment, pins 20 are used as the marking devices which are placed around the periphery of the face 18. The placement of the pins 20, or other marking member, must form an outline that is slightly greater than the periphery of the outlet box in order to provide sufficient clearance after cutting. Although pins 20 are used in the illustrated embodiment to mark the cutting lines, the marking members can be any method of transferring a mark to the back of the sheet material. Other methods of marking, such as chalk, lead and ink, are disclosed in the above identified applications and patents.

The back of the marking device 10, as illustrated specifically in FIG. 2, incorporates an opposing pair of horizontal receptacle channels 30 and an opposing pair of vertical receptacle channels 32. The horizontal receptacle channels 30 extend to the edge of the body 12, thereby enabling the marking device to be placed upon a double receptacle box having a width wider than the body 12. The vertical receptacle channels 32 connect the horizontal receptacle channels 30 and receive the vertical sides of the receptacle box. When the marking device 10 is used on a double receptacle box, one of the vertical receptacle channels 32, along with the two horizontal receptacle channels 30 are engaged with the actual receptacle box, thus enabling the same marking device can be used for both single and double receptacle boxes. Alternatively, the disclosed marking device can be enlarged to extend around the periphery of the double, or even triple, outlet receptacle boxes. Once the width of the marking device is greater than can be managed by the contact plate/connector combination, either a center brace can be used or the contact plate can be placed in the horizontal direction with multiple contacts. Alternatively, the contact pad or hinges disclosed in the parent cases can be used.

In the preferred embodiment, the marking devices disclosed herein are manufactured from a material, such as nylon, vinyl or hard rubber, that maintain a memory and have a high resistance to breakage after repeated flexing, such as ABS plastic. Preferably the material enables the entire unit to be manufactured as a single piece, however in embodiments where the material of manufacture is unable to be molded as a single unit, the method of connecting the flexing contact plate to the body through use of connectors will be evident to those skilled in the art.

The base extension 36 is dimensioned to extend beyond the body 12 of the marking device 10 and fit within the receptacle box. This extension enables the marking device 10 to be easily placed onto the box as it readily catches on the inside of the box when moved into place. Although an advantage for easy placement, the base extension 36 can have the same depth as the remaining portions of the body 12.

Figure 4:
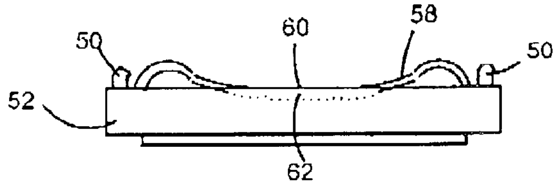
FIG. 4 is an side view of an alternate embodiment of the disclosed marking device.

In order to distance the sheet material from the marking pins 20, or other marking device, the contact plate 16 extends beyond the surface of the face 18 and marking pins 20. In these embodiments, the contact plate 16 is curved at each end with the curved ends providing the resistance to the sheet material contacting the pins 20. Any design can be used for the contact plate, keeping in mind the resistance required and the fact that the sheet material must be spaced from the marking members an even distance on both the top and the bottom of the device. In the preferred embodiment illustrated in FIG. 3, the base 17 of the contact plate 16 is recessed below the face 18 of the marking device 10. The recessing of the base 17 enables a substantial curve, or spring, to the contact plate 16 without increasing the over all dimensions of the device 10. Alternatively, however, the base 62 of the contact plate 58, as illustrated in FIG. 4, can be flush, or almost flush, with the face 60.

The pins 20, or other marking members, must extend beyond the face 18 a distance less than that of the contact plate 16. In this way, the sheet material first encounters the contact plate 16 rather than the marking pins 20. Once positioned on the wall, the material is pressed inwardly to contact the pins 20, marking the back of the sheet material with the location and dimensions of the receptacle box. The distance between the uncompressed contact plate 16 and the marking point of the pins 20 must not be so great as to require undue pressure and a distance of about ⅛ to about ¼ inch will be sufficient in most embodiments, however in some end uses the dimensions can require adjusting.

The thickness of the contact plate 16 must not be so thick as to require extreme pressure to be applied to flex the connectors 14, making the device difficult to use. In the preferred embodiment 10 to 15 pounds of pressure is preferred, however, this can be increased if required for specific applications. The amount of pressure that is required to flex the flexible contact plate can be altered based upon thickness and width of the contact plate and the width of the connectors. The greater the width of the connectors, or thickness of the contact plate itself, the more pressure it will require to place the sheet material in contact with the marking members.

Figure 5:
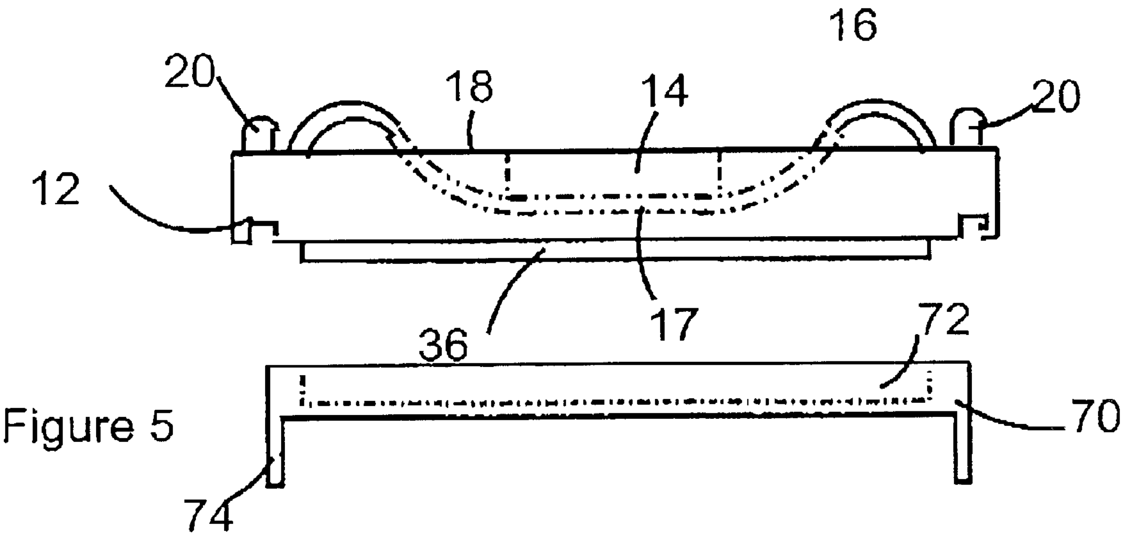
FIG. 5 is a side view of the extender for use with the device of FIG. 1.

The foregoing is applicable for receptacle boxes without the receptacle mounted. In cases where the receptacle has already been mounted, the extender 70 of FIG. 5 can be used with the marking devices disclosed heretofore. The receiving area 72 of the extender 70 is dimensioned to receive the extended portion 36 of marking device. The legs 74 are dimensioned to provide a friction fit with the outside of the receptacle box, thereby enabling the marking device 10 to be placed around the receptacle box rather than inside the box. It should be noted that the connections between the receiving area 72 and the extended portion 36 are maintained through friction fit. The extender 70 can be dimensioned to fit over only the horizontal or vertical edges of the box or completely around the periphery of the extended area of the marking device. Other methods for using the marking device 10 with already mounted receptacles are disclosed in the parent applications.

If the sheet is not prevented from being marked upon initial contact, the surface of the sheet material could be marked one or more times during the alignment process. The amount of pressure required to prevent unintentional contact with the sheet material will be dependent upon the weight of the sheet material and for marking devices with specific end uses the pressure can be adjusted during manufacture. For example, paneling weighs only about 30 to 40 pounds per panel and would therefore require less resistance to maintain the sheet away from the marking members during alignment. Sheetrock, or other heavy sheet materials, however, weighs about 40–100 pounds and more in the larger sizes. For marking devices that are to be usable with sheetrock, the pressure required to compress the contact plate would be substantially greater than the pressure required for paneling. As a general use for homeowners contact plates requiring about 10 to 30 pounds of pressure to place the sheet material in contact with the marking members would be applicable.

It should be obvious to anyone skilled in the art that the dimension of any of the foregoing embodiments can be altered for use with other specific sized outlets, such as double receptacle box outlets, car stereo cutouts, A/C inlet/outlets, etc. Additionally, any of the extenders or spacers disclosed in the foregoing parent applications can be incorporated with the disclosed device to enable the device to be used on receptacle boxes containing plugs or switches.

Since other modifications and changes varied to fit particular operating requirements and environments will be apparent to those skilled in the art, the invention is not considered limited to the example chosen for the purposes of disclosure, and covers all changes and modifications which do not constitute departures from the true spirit and scope of this invention.

What is claimed is:

1. A marking device for placing an indicator mark on one side of a sheet of material to mark the approximate periphery of a stationary object, said marking device having:

a base, said base having a first surface, a second surface and a contact plate receiving area within the center of said base;

a flexible contact plate, said contact plate being within said contact plate receiving area and having a first surface and a second surface, multiple marking members, each of said multiple marking members being around the periphery of said base and having a marking surface maintained in and extending from said base first surface a distance less than said contact plate to transfer a mark to said sheet of material upon pressured contact with said sheet of material, a pair of connectors, said pair of connectors connecting opposing sides of said contact plate to said base, wherein a portion of said contact plate extends from said base a distance sufficient to prevent said sheet material from contacting said multiple marking members without the application of pressure to flex said contact plate.

2. The device of claim 1 wherein said multiple marking members are pins, said pins extending from said base first surface a distance less than said contact plate.

3. The device of claim 1 wherein said marking device is manufactured from a plastic.

4. The marking device of claim 3 wherein said base, said pair of connectors and said contact plate are molded from a single mold.

5. The marking device of claim 1 wherein said multiple marking members are a liquid.

6. The marking device of claim 1 wherein said multiple marking members are a powdered material.

7. The marking device of claim 1 wherein said second surface further comprises a pair of horizontal channels.

8. The marking device of claim 7 further comprising vertical channels, said vertical channels extending between said pair of horizontal channels.

9. A marking device for placing an indicator mark on one side of a sheet of material to mark the approximate periphery of a stationary object, said marking device having:

a base, said base having a first surface, a second surface and a contact plate receiving area;

multiple marking pins, each of said multiple marking pins having a marking surface raised above said first surface of said base to transfer a mark to said sheet of material upon pressured contact with said sheet of material, a flexible contact plate, said contact plate being within said contact plate receiving area and having a first surface and a second surface, a pair of connectors, said pair of connectors connecting opposing sides of said contact plate to said base, wherein a portion of said contact plate extends from said base a distance sufficient to prevent said sheet material from contacting said multiple marking members without the application of pressure to flex said contact plate, said pressure.

10. The method of marking a sheet of material with an outline of a stationary object's position using a marking device having a base, multiple marking members around the periphery of a first surface of said base to transfer a marks onto said sheet of material, and a pair of connectors connecting a flexible, contact plate having a contact surface extending from the center of said first surface of said base, comprising the steps of:

securing said base to an exposed edge of said stationary object, placing said sheet of material against said contact plate, applying pressure to said material, compressing said contact plate;

causing said marking members to come in contact with said sheet of material;

removing said sheet of material.

* * * * *